United States Patent Office 3,249,399
Patented May 3, 1966

3,249,399
PROCESS FOR CHLORINATION OF ELECTRO-
LYTIC COPPER REFINERY SLIMES
James E. Hoffmann, Maplewood, and Dominic C. Cusa-
nelli, Old Bridge, N.J., assignors to American Metal
Climax, Inc., New York, N.Y., a corporation of New
York
No Drawing. Filed Nov. 20, 1963, Ser. No. 325,169
10 Claims. (Cl. 23—98)

The present invention is directed to a process for treating electrolytic copper refinery slimes.

Almost all selenium and tellurium are obtained as a by-product of precious metals recovery from electrolytic copper refinery slimes, often also called anode mud, electrolytic residues, and sludges, which are all meant to be included in the term "slimes" as used herein. Slimes usually contain gold, silver, platinum group metals, copper, lead, tin, antimony, selenium, tellurium, arsenic, etc., and minor amounts of other metals dependent upon the source.

The principal methods of slimes treatment for the separation of selenium and other valuables are (1) smelting with soda ash, (2) roasting with soda ash and (3) roasting with sulfuric acid, the latter method resulting in the volatilization of the selenium primarily as selenium dioxide. The details of these processes including various modifications thereof are described in an article by Scholen and Elkin entitled "Treatment of Electrolytic Copper Refinery Slimes," J. of Metals, May 1950, Transactions AIME, vol. 199, pp. 764-777. United States Patent No. 2,948,591 discloses a process for recovering selenium based on the oxidation thereof. Antimony is usually eliminated in the course of processing the material in the doré furnace utilizing cumbersome slagging procedures. These are time-consuming and costly. The antimony-containing material removed from the doré furnace, which is rich in precious metals, is conventionally recycled to the copper smelter wherein the presence of antimony is undesirable. Similarly, any arsenic present is also troublesome in the recovery of the precious metals.

It is an object of the present invention to provide an improved process for eliminating selenium and tellurium among other metals and/or metalloid values from slimes whereby said values may be subsequently recovered. It is also an object of this invention to provide a process for treating slimes for elimination of selenium and tellurium whereby the resulting residue contains little or no antimony and arsenic. Other objects and advantages of this invention will become apparent from the specification.

The process of the present invention contemplates chlorination of slimes, whereby substantially all of the selenium, tellurium, antimony, arsenic and tin content of the material treated is converted to the respective chlorides and removed from the retraction zone as volatile products leaving a residue that is, for all practical purposes, devoid of these elements.

Slimes, as collected periodically from the refinery tanks, are usually screened to remove large particles of metallic copper. They are then usually decopperized as, for example, by subjecting the material to an acid leach preliminary to further treatment. In accordance with the present invention, the decopperized and at least partially dried slimes are then chlorinated preferably by treatment with gaseous chlorine with the reaction system being maintained at elevated temperatures.

The chlorination reaction, to achieve maximum yield, is dependent upon the interrelated control of the bed temperature and the flow of chlorine. If the reaction temperature is too high, the elimination of tellurium is substantially lowered and the elimination of selenium is somewhat lowered. The chlorination reaction being exothermic, an excessive rate of flow of chlorine tends to cause overheating of the charge bed. The most advantageous rate of flow of chlorine varies with such factors as (1) the size and shape of the apparatus, (2) the amount, size and physical form of the material being treated, (3) whether the process is batch or continuous, etc. The process may be carried out in a fluid bed utilizing powder reactant materials, and/or inert diluents to control the bed temperature. Such expedients for controlling bed temperatures and reaction rates are well-known in the petroleum refining art. Dependent upon the material being treated, the presence of a reducing agent such as coke, carbon monoxide, producer gas, etc., during the chlorination may be required, or preferable, to obtain maximum yield.

The presently preferred chlorination process is a batch process utilizing slimes in the form of agglomerates. The term "agglomerates" is meant to include agglomerates generally such as pills, pellets, briquettes, extrudes, etc. They may be prepared by a variety of means. These include pelletizing in suitable apparatus as described in U.S. Patent No. 2,948,591. Extrudes may be formed in an extruder equipped with a die plate having perforations of the desired size.

The size and porosity of the agglomerates may be varied dependent upon the desired reaction time and the equipment utilized. In any event, the size, shape and porosity of the agglomerates should be such as to permit adequate penetration of the gas between the agglomerates as well as within the individual agglomerate. For this reason, the use of excessive compacting pressures and multiple passes of the material through an extruder should generally be avoided. At the same time, the individual agglomerates should possess sufficient strength or binding characteristics to resist deterioration and crumbling during handling and in the reactor. In forming agglomerates having suitable physical properties and characteristics, the slimes should contain sufficient moisture to avoid dusting whereby loss of metal values would take place. Agglomerates having dimensions between about $\frac{1}{16}$ inch and about one inch are most useful. Preferred agglomerates are prepared by extrusion providing extrudes having a diameter of about $\frac{1}{4}$ inch and a length of about $\frac{1}{2}$ inch. Fine particles should be avoided as they tend to pack between the agglomerates and interfere with the gas-solid contact required during the chlorination reaction.

A binder should be included in the mix to provide agglomerates having the desired physical strength, and also to act as an inert diluent which assists significantly in the control of the reaction by preventing localized overheating which can lead to fusion of the bed. From about 3.5% to 10% and preferably from about 5% to 8% of a binder material such as talc, fuller's earth, diatomaceous earth or bentonite may be used with the use of bentonite being preferred. To prevent dusting and to enable the formation of porous agglomerates having requisite strength, between 12.5 and 17.5% and preferably about 15% of water is included in the mix. The agglomerates are substantially dried before chlorination in the preferred process.

In the usual batch chlorination process, chlorine gas is passed into the reaction chamber and through the mass of agglomerates at a rate sufficient to obtain good yields of the volatile chlorides without causing the reaction to proceed too rapidly. The total chlorine needed varies with the amount of metal in the slimes susceptible to chlorination. Generally, the use of from about 0.3 pound to about 0.7 pound of chlorine per pound of slimes is satisfactory. It is preferred to introduce a secondary input of chlorine near the exit port for the gases in the reaction chamber to form the higher chlorides of the desired volatile reaction products. An excess of total chlorine is not harmful but is uneconomical as the excess is wasted.

The bed temperature should be controlled so as to obtain the maximum elimination of the volatile chlorides as rapidly as possible without, however, incurring fusion of the charge or the occurence of undesirable side reactions. The temperature range for obtaining satisfactory yields from the usual charge containing both selenium and tellurium is between 300° C. and 500° C. with temperatures between 425° C. and 475° C. being generally preferred.

As previously indicated, at least some degree of control is provided against the occurrence of undesirable reaction conditions during the chlorination step by the presence of an inert binder substance in the agglomerate mix. Further control is enabled by additionally including in the charge up to 50% by weight of a carbonaceous substance which serves not only as a diluent but also as a reducing agent as well during chlorination of the material. The carbonaceous material may be supplied in solid form such as coke or in gaseous form such as carbon monoxide or combinations of both. When using the solid carbonaceous material it may be dispersed throughout the charge bed in the form of lumps and the like or it may be incorporated in finely divided form within the agglomerate mix or a combination of both may be used. Incorporating finely divided carbon (coke) in the agglomerate mix is preferred as being generally conducive to best results when using solid carbonaceous material.

Such reducing agent, preferably carbon (coke) or carbon monoxide is actually required to obtain the maximum tellurium recovery when treating certain slimes. When using finely divided coke, generally between 10% and 50% and preferably between 20% and 30% by weight of the agglomerating mixture should be included. When utilizing carbon monoxide, it is introduced in a chlorine to carbon monoxide ratio of between about 20:1 (by volume) and 1:1 and preferably between about 10:1 and 7½/2:1. Experiments carried out comparing the results obtained using the preferred amount of coke as against the preferred amount of carbon monoxide in the process indicated that carbon monoxide is a more efficient reducing agent on the basis of carbon supplied to the reaction chamber.

The volatile chloride products from the chlorination reactor are passed through an aqueous scrubber. A portion of the selenium chloride and the tellurium chloride dissolves in the aqueous solution with the remainder precipitating in the scrubber. Most of the antimony chloride and arsenic chloride go into the solution. Successful recovery has been obtained utilizing water, alkaline solutions (e.g. 30% NaOH) and also acid solutions (e.g. 6N HCl and 20% $H_2SO_4$) in the scrubber. A preferred recovery system consists of passing the volatile products through two water scrubbers in series followed by a final cleaning in a sodium hydroxide solution. This recovery system was used in the examples herein.

Tin, if present in the slimes, is also chlorinated forming a volatile product which becomes eliminated from the slimes along with the other volatile chlorides of selenium, tellurium, antimony and arsenic from which it may be subsequently separated and thereby recovered.

The invention is illustrated in the examples but is not to be construed as limited to details described therein. The parts and percentages are by weight except where specifically indicated otherwise. In all the examples the slimes treated were decopperized and preliminarily dried. The slimes, coke, (−80 mesh coke breeze) and bentonite were mixed in a blender for fifteen minutes. Fifteen percent of water was then blended in. The mixture was then passed through an electric extruder to produce cylindrically shaped agglomerates approximately ¼″ in diameter and ½″ long. These agglomerates were dried and sampled for head analysis. They were then placed into the reactor comprising a 2″ diameter tube in Examples 1–9 and a 5″ diameter tube in Example 10. The reactor was heated and chlorine passed in. The starting materials, process conditions and results, are specified in the table for ten examples. The slimes, identified as "A," "B" and "C" were samples of representative electrolytic copper refinery slimes collected at three different refineries. The mixed starting material (Examples 9 and 10) consisted of three parts from source A, and one part each from source B and source C. A comparison of the tellurium elimination results of Examples 2, 4, 5 and 8, illustrates that the reducing agent is required when treating slimes from some sources (A and C), whereas it is not required with specified different source materials (B). Although the results are given only in terms of "elimination" of selenium, tellurium and antimony from the test material, complete analysis of the reaction products in a number of runs established that these values may be satisfactorily recovered in the system described. Analysis of the chlorinated residues also established that arsenic was effectively eliminated.

| Ex. | Charge | | | | Gases | | Time, min. | Bed temp., °C. | Analysis, percent | | | Elimination, percent | | | Source of Slime |
|---|---|---|---|---|---|---|---|---|---|---|---|---|---|---|---|
| | Slimes, parts | Coke, parts | Bentonite, parts | Total, g. | $Cl_2$, cc./min. | CO, cc./min. | | | Se | Te | Sb | Se | Te | Sb | |
| 1 | 100 | 50 | 7.5 | 500 | 600 | | 85 | 450 | 1.45 | 1.95 | (¹) | 100 | 90 | (¹) | A. |
| 2 | 100 | 0 | 0 | 500 | 600 | | 90 | 450 | 2.88 | 3.32 | (¹) | 100 | 58.4 | (¹) | A. |
| 3 | 100 | 15 | 6 | 500 | 700 | | 105 | 460 | 16.1 | 2.0 | (¹) | 100 | 99 | (¹) | B. |
| 4 | 100 | 0 | 5 | 500 | 700 | | 90 | 350 | 19.6 | 1.6 | (¹) | 99.5 | 98.5 | (¹) | B. |
| 5 | 100 | 0 | 5 | 400 | 700 | | 90 | 400 | 19.9 | 1.5 | (¹) | 99.6 | 96.5 | (¹) | B. |
| 6 | 100 | 30 | 9 | 500 | 700 | | 135 | 450 | 15.7 | 1.85 | (¹) | 99.4 | 97 | (¹) | B. |
| 7 | 100 | 30 | 9 | 500 | 700 | | 100 | 450 | 4.49 | 0.78 | (¹) | 96.4 | 90 | (¹) | C. |
| 8 | 100 | 0 | 7 | 500 | ² 700+100 | | 110 | 500 | 6.11 | 0.62 | (¹) | 99.4 | 24 | (¹) | C. |
| 9 | 100 | 0 | 7 | 500 | ² 700+100 | 70 | 110 | 450 | 6.7 | 1.28 | 4.51 | 100 | 96 | 96.2 | Mixed. |
| 10 | 100 | 0 | 7 | 5,000 | ² 3,800+500 | 400 | 180 | 450 | 6.33 | 1.24 | 3.4 | 100 | 94.8 | 93.2 | Do. |

¹ Not determined.
² Additional chlorine introduced through a secondary input near the exit port for the volatile gases.

The volatile chlorides, consisting of selenium, tellurium, antimony, tin and arsenic may be separated and recovered after removal from the scrubbing system, by separatory techniques, e.g. precipitating the selenium and tellurium separately from a hydrochloric acid solution with additions of $SO_2$. The precipitated material is washed and the wash solution is combined with the hydrochloric acid solution.

The residue from the chlorination reactor is dechlorinated and treated to recover the remaining metal values which include the precious metals.

The instant chlorination process described herein results in effective volatilization and elimination of selenium, tellurium, antimony, tin and arsenic from slimes whereby subsequent treatment enables the separation and recovery of the components as commercially valuable products. The process is relatively simple and economical and provides the highly significant advantage of removing not only arsenic but antimony as well from the circuit as it applies to the subsequent treatment of the residues for the recovery of metal values inclusive of the precious metals therefrom.

Obviously, many modifications and variations of the present invention are possible in the light of the above teachings. It is therefore to be understood that, within the scope of the appended claims, the invention may be practiced otherwise than as specifically described.

What is claimed is:

1. A process for simultaneously separating selenium, tellurium, antimony and arsenic values together with any tin value which may also be present from electrolytic copper refinery slimes additionally containing at least one other metal value the chloride of which is non-volatile at temperatures from 300 to 500° C. which process comprises the steps of agglomerating said slimes in admixture with an inert binder, chemically converting at least a major portion of the selenium, tellurium, antimony and arsenic values as well as any tin values present in said slimes into volatile chlorides by contacting said agglomerated slimes with chlorine gas in a reaction zone while maintaining a reaction temperature with said zone of between 300° C. and 500° C. and removing the volatile chlorides from said reaction zone.

2. The process of claim 1 wherein the chemical conversion of selenium, tellurium, antimony and arsenic values as well as tin values present in said slimes is carried out in the presence of a carbon-containing reducing agent.

3. The process of claim 1 including the additional step of further chlorinating the volatile chlorides to convert the same to higher chloride form prior to removing the volatile chlorides from the reaction zone.

4. The process of claim 1 wherein said inert binder substance is bentonite and comprises from 3.5 to 10% of the agglomerate weight.

5. The process of claim 1 wherein said electrolytic copper refinery slimes are decopperized prior to the agglomerating step.

6. The process of claim 1 wherein the carbon-containing reducing agent is carbon monoxide and the ratio of chlorine to carbon monoxide used ranges from 20:1 to 1:1 by volume.

7. The process of claim 3 wherein chlorine gas is used in amounts ranging from 0.3 to 0.7 pound per pound of slimes for chlorinating said agglomerates.

8. A process for separating selenium, tellurium, antimony, arsenic and tin values from electrolytic copper refinery slimes additionally containing at least one other metal value the chloride of which is non-volatile at temperature from 300 to 500° C. as well as copper values which process comprises the steps of decopperizing said slimes, at least partially drying said decopperized slimes, agglomerating said dried decopperized slimes in admixture with an inert binder to provide porous agglomerates, subjecting the porous agglomerates to chlorination by introducing chlorine gas into a reaction zone while maintaining a reaction temperature within said zone of between 300° C. and 500° C. to form volatile chlorides of selenium, tellurium, antimony, arsenic and tin and a residue and removing said volatile chlorides from said reaction zone to effect the simultaneous and substantially complete separation of said selenium, tellurium, antimony, arsenic and tin values from other metal values initially contained in said slimes and remaining in said residue.

9. The process of claim 8 wherein the chlorine gas used in the chlorination reaction is between 0.3 and 0.7 pounds per pound of slimes and a portion of said chlorine is contacted directly with the volatile chlorides to convert the same to higher chloride form.

10. The process of claim 8 wherein the chlorination is carried out in the presence of a carbonaceous material selected from the group consisting of coke, carbon monoxide mixtures thereof.

References Cited by the Examiner

UNITED STATES PATENTS

| | | | |
|---|---|---|---|
| 890,432 | 6/1908 | Masson | 23—98 XR |
| 1,730,548 | 10/1929 | Welch | 23—87 |
| 1,931,944 | 10/1933 | Wood et al. | 23—98 |
| 2,184,887 | 12/1939 | Muskat et al. | 23—87 XR |
| 2,594,370 | 4/1952 | Warburton | 23—87 |
| 2,695,221 | 11/1954 | Klugh et al. | 252—188.3 XR |
| 2,723,903 | 11/1955 | Cyr et al. | 252—188.3 XR |

FOREIGN PATENTS 26,644    1911    Great Britain.

OSCAR R. VERTIZ, *Primary Examiner.*

MAURICE A. BRINDISI, *Examiner.*

E. STERN, *Assistant Examiner.*